UNITED STATES PATENT OFFICE.

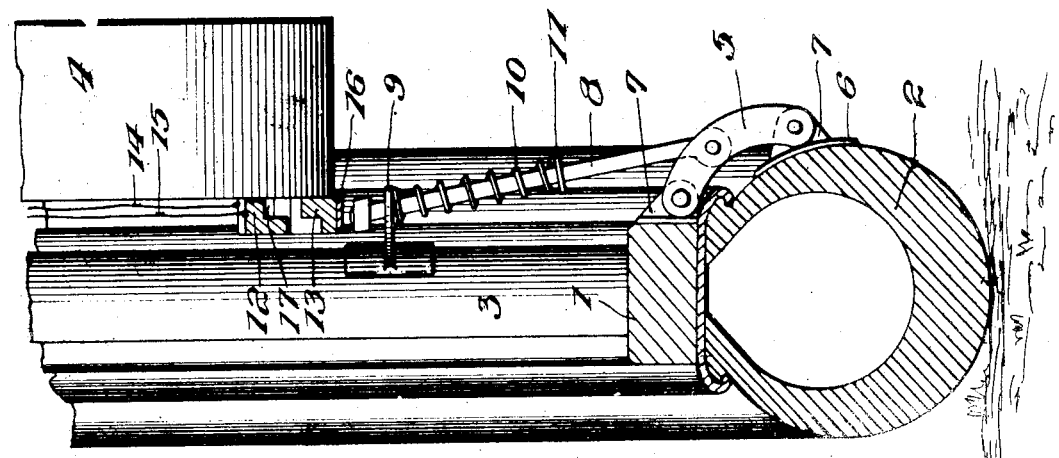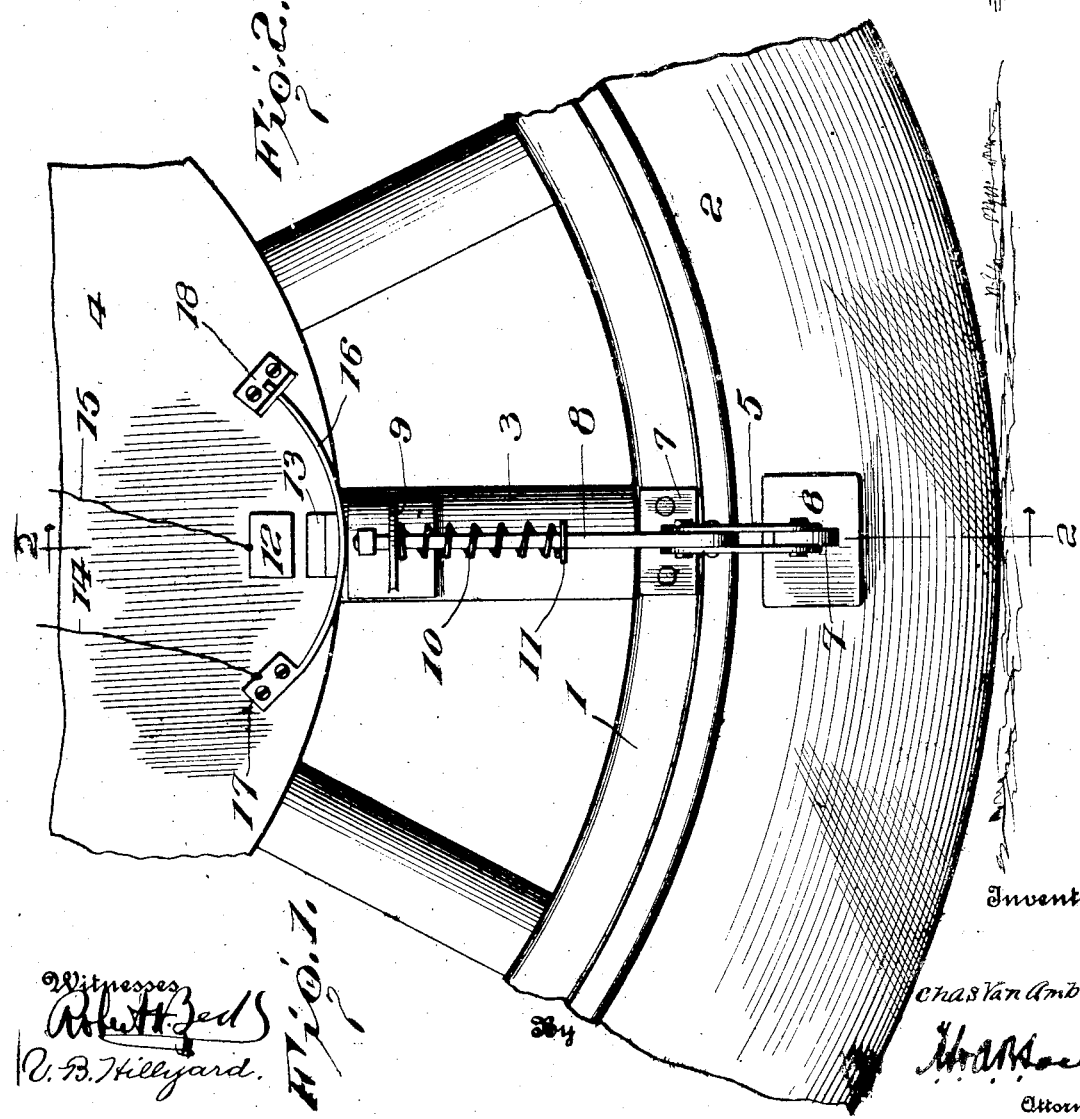

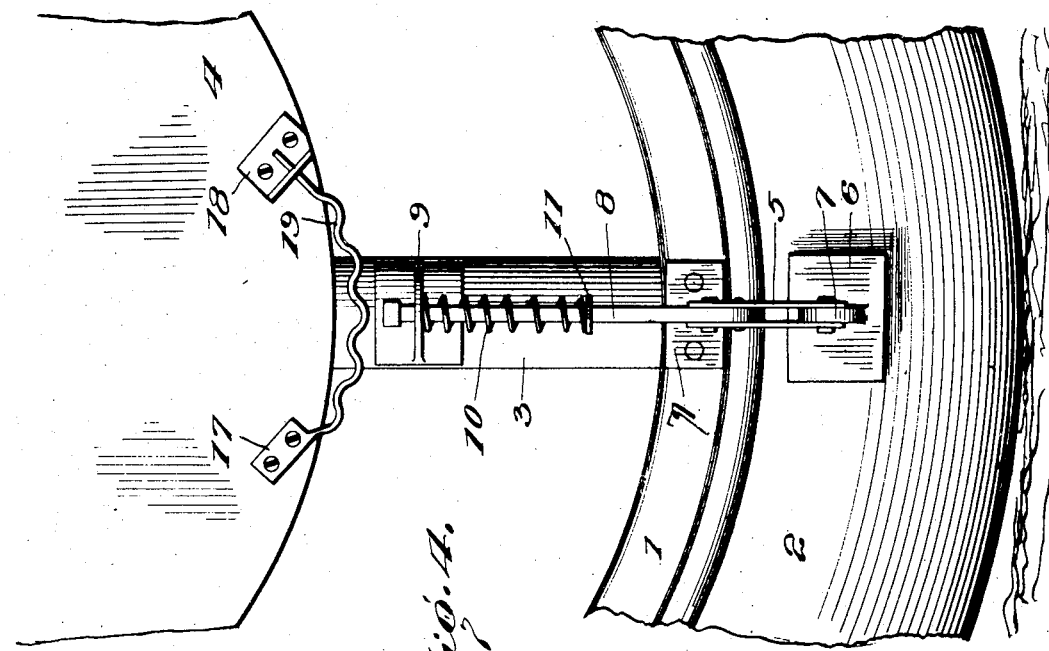
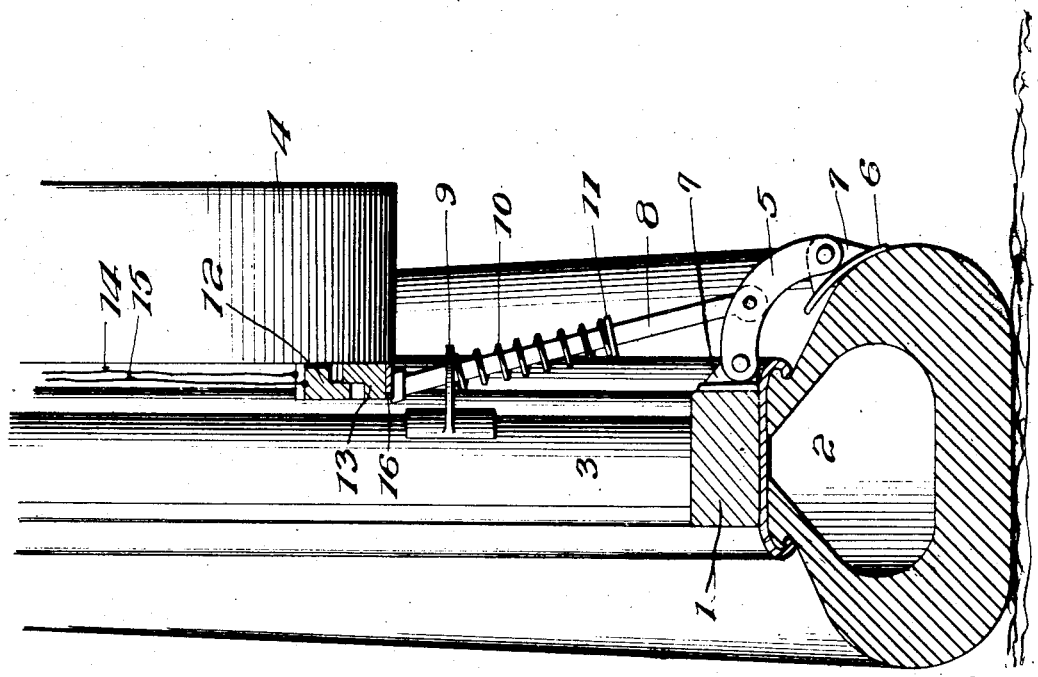

CHARLES VAN AMBURGH, OF TACOMA, WASHINGTON.

TIRE-ALARM.

1,184,220.   Specification of Letters Patent.   Patented May 23, 1916.

Application filed March 17, 1915. Serial No. 15,129.

*To all whom it may concern:*

Be it known that I, CHARLES VAN AMBURGH, a citizen of the United States, residing at Tacoma, in the county of Pierce and State of Washington, have invented certain new and useful Improvements in Tire-Alarms, of which the following is a specification.

In the operation of motor vehicles and like carriers having the wheels equipped with pneumatic tires considerable expense and annoyance are experienced by improper inflation of the tires or by a softening of the same due to a loss of internal air pressure after being properly inflated.

When a pneumatic tire loses internal pressure by reason of puncture, a leaky valve or from other cause producing a slow leak, the tire spreads or flattens at the load point and is subjected to compression between the surface of the road and the flanges of the rim, thereby producing a rim cut or otherwise weakening the tire with the result that its period of service is materially shortened.

The present invention provides means to automatically apprise the driver of a motor vehicle when a tire softens by reason of the loss of internal air pressure so that proper repairs may be made in ample time before the tire suffers injury.

The present invention provides indicating means either of a visual or audible nature and adapted to be automatically actuated by an abnormal spreading of the tire at the load point. The indicating means may be disposed in any convenient position according to the specific character thereof and the actuating means provided for operating the indicating means may be mounted in any manner so as to be automatically actuated by the undue spreading of the tire when the inner pressure is reduced from any cause to such an extent as to subject the tire to deleterious effects if continued in service after losing air pressure.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,—Figure 1 is a detail view in elevation showing the application of the invention; Fig. 2 is a section on the line 2—2 of Fig. 1; Fig. 3 is a view similar to Fig. 2 showing the relation of the parts when the indicating means are actuated by reason of the tire spreading; Fig. 4 is a view similar to Fig. 1 of a modification.

Corresponding and like parts are referred to in the following description and indicated in all the views of the drawings by the same reference characters.

The numeral 1 designates the rim of a wheel which is provided with a pneumatic tire 2 of any make or variety. The numeral 3 designates a spoke of the wheel and 4 a convenient part of the chassis or running gear for supporting the indicating means or a part thereof. The part 4 may consist of the brake drum or housing therefor or any suitable portion of the main frame of the vehicle adapted to receive the part to be attached thereto.

The invention comprises a tire operated member and indicating means to be actuated by the tire operated member when the same is moved by the abnormal spreading of the tire. The tire operated member comprises an arm 5 and a shoe 6, the latter being sufficiently broad to prevent injurious contact with the wire. The arm 5 is preferably curved and pivoted at one end to the rim of the wheel preferably by means of a bracket 7 which is secured to the rim in any manner. By having the shoe 6 pivoted to the arm 5 it readily conforms to the tire so as to distribute the pressure thereon. The shoe 6 is disposed a sufficient distance from the tread of the tire so as not to come in contact with the surface of the road or receive injury in the ordinary use of the vehicle. A rod 8 is pivoted at its lower end to the arm 5 and extends along a side of the wheel and is supported at its inner end in a guide 9 attached to the spoke 3. The guide 9 may be of any construction and, as shown, is of the nature of a bracket which is fastened to the spoke 3 in any manner. An expansible helical spring 10 is mounted upon the rod 8 between the guide 9 and a stop 11 provided on the rod 8. This spring normally exerts an outward pressure upon the rod 8 so as to hold the shoe 6 in contact with a side of the tire at all times and under all conditions. When the tire is properly inflated the parts assume the position about as shown in Fig. 2, but when the tire becomes deflated or loses air pressure so as to spread and flatten on the tread side, as indicated in Fig. 3, the parts are actuated and assume the position substantially as indicated in Fig. 3, thereby operating the indicating means, such as a light, bell or alarm of any nature tending to give warning that the tire has become soft and is in need of attention.

The indicating means most generally employed are of an electric nature and are included in an electric circuit which is adapted to be closed by means of contacts 12 and 13. The contact 12 is fixed, whereas the contact 13 is movable. The indicating means not shown, is included in an electric circuit represented by the lead wires 14 and 15. The wire 15 is in electric connection with the contact 12 whereas the wire 14 is in electric connection with the contact 13. A bow spring 16 receives the movable contact 13 and is fastened at one end to the support 4 by means of a bracket 17 which may form a part of the spring. A bracket 18 attached to the support 4 receives the opposite end of the spring 16. The spring 16 is disposed in the plane of travel of the inner end of the rod 8 and its opposite end portions constitute cams for the inner end of the rod 8 to travel upon when the tire operated member is actuated by a spreading of the tire.

Under normal conditions, that is, when the tire is properly inflated so as not to spread unduly at the load point the contacts 12 and 13 stand apart but when the tire loses air pressure from any cause and spreads at the load point, as indicated in Fig. 3, the tire operated member is actuated and the contacts 12 and 13 brought together thereby closing the circuit and bringing the indicating means into action so as to give warning to the driver or other occupant of the vehicle that the tire is in need of attention. It is to be understood that each tire of a vehicle will be similarly equipped with indicating means, hence the particular tire in need of attention will be designated at the time when giving warning that a tire is in need of repair.

In the form illustrated in Fig. 4, the indicating means is in the nature of an audible signal, the sound being produced by means of the inner end of the rod 8 engaging a plurality of projections 19 disposed in the path thereof. While the sound indicating means may be of any nature it is preferred to utilize a resilient strip which is fluted and is connected at its ends to the support 4, said fluted strip being disposed in the line of travel of the inner end of the rod 8 so as to be engaged thereby when the tire spreads at the load point beyond the ordinary.

Having thus described the invention, what is claimed as new is:—

1. In a tire alarm of the character specified, an arm pivotally mounted upon the wheel and disposed with its free end in contact with the side of the tire and adapted to be automatically actuated thereby when the tire is unduly spread, a rod pivotally connected with the arm and extending along a side of the wheel, a guide mounted upon the wheel and receiving the inner end of the rod, and a resilient bow-shaped member disposed in a plane parallel with the wheel and mounted upon the vehicle frame and adapted to be engaged by the inner end of the rod when the tire spreads.

2. In a tire alarm of the character specified, the combination, of a tire operated member mounted upon the wheel and adapted to be automatically actuated by the tire when abnormally spread at the load point and indicating means including a member mounted upon the frame of the vehicle and disposed in the path of the tire operated member to be actuated thereby, said member having its opposite end portions deflected and provided in its length with a plurality of projections to be engaged by the tire operated member.

In testimony whereof I affix my signature in presence of two witnesses.

CHARLES VAN AMBURGH. [L. s.]

Witnesses:
J. W. Hoors,
M. P. Pfoff.